(12) United States Patent
Guarnieri

(10) Patent No.: US 10,410,052 B2
(45) Date of Patent: Sep. 10, 2019

(54) STROKE BASED SKELETONIZER

(71) Applicant: Konica Minolta Laboratory U.S.A., Inc., San Mateo, CA (US)

(72) Inventor: Stuart Guarnieri, Laramie, WY (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 126 days.

(21) Appl. No.: 15/828,283

(22) Filed: Nov. 30, 2017

(65) Prior Publication Data

US 2019/0163969 A1 May 30, 2019

(51) Int. Cl.
*G06K 9/00* (2006.01)
*G06K 9/62* (2006.01)
*G06K 9/32* (2006.01)

(52) U.S. Cl.
CPC ..... *G06K 9/00422* (2013.01); *G06K 9/00416* (2013.01); *G06K 9/00456* (2013.01); *G06K 9/3258* (2013.01); *G06K 9/6202* (2013.01); *G06K 2209/01* (2013.01)

(58) Field of Classification Search
CPC ........... G06K 9/00422; G06K 9/00456; G06K 9/3258; G06K 9/00416; G06K 9/6202; G06K 2209/01
See application file for complete search history.

(56) References Cited

U.S. PATENT DOCUMENTS

| | | | |
|---|---|---|---|
| 7,263,538 B2 | 8/2007 | Hong | |
| 7,362,901 B2 | 4/2008 | Walch | |
| 7,724,958 B2 | 5/2010 | Walch | |
| 8,295,630 B2 | 10/2012 | Lee et al. | |
| 8,917,935 B2 * | 12/2014 | Epshtein | G06K 9/00463 358/462 |
| 10,007,863 B1 * | 6/2018 | Pereira | G06K 9/4671 |
| 2009/0285482 A1 | 11/2009 | Epshtein et al. | |

OTHER PUBLICATIONS

Bin Bao and Hongbo Fu, "Vectorizing Line Drawings With Near-Constant Line Width," IEEE International Conference on Image Processing, Oct. 2012 (4 pages).

Boris Epshtein, Eyal Ofek, and Yonatan Wexler, "Detecting Text in Natural Scenes with Stroke Width Transform," Microsoft Corporation, IEEE International Conference on Computer Vision and Pattern Recognition, Aug. 2010 (8 pages).

\* cited by examiner

*Primary Examiner* — Phuoc Tran

(74) *Attorney, Agent, or Firm* — Osha Liang LLP

(57) ABSTRACT

A method for processing a stroke in an image is provided. The stroke includes a plurality of pixels and the method includes: executing a modified 4-way stroke width transform (SWT) on a mask of the stroke; determining a plurality of certain centerline points among the pixels based on the modified SWT; generating a plurality of polylines within the stroke based on the certain centerline points; determining a plurality of regions of certainty based on the polylines; removing the regions of certainty from the mask and leaving a plurality of regions of uncertainty in the mask; calculating a plurality of joints and end caps for each of the polylines based on the polylines and the regions of uncertainty; generating a completed polyline path by connecting the polylines based on the joints and end caps; and generating a description of the stroke based on the completed polyline path.

20 Claims, 12 Drawing Sheets

Stroke Width Image
399

1 0/180 degrees
2 45/225 degrees
3 90/270 degrees
4 135/315 degrees

Stroke Orientation Image
398

U Uncertain Pixels
C Certain Pixels

| Polygon Path | Sub-Path | Average Stroke Width | Average Normalized Color(R,G,B) | Coordinates (x, y, width, orientation, (RGB)) |
|---|---|---|---|---|
| P1 | SP1-1 | 1 | (0.40, 0.40, 0.40) | (1,2,1,3,(0.40,0.40,0.40)), (1,3,1,3,(0.40,0.40,0.40)), (1,4,1,3,(0.40,0.40,0.40)), (1,5,1,3,(0.40,0.40,0.40)), (1,6,1,3,(0.40,0.40,0.40)), (1,7,1,3,(0.40,0.40,0.40)), (1,8,1,3,(0.40,0.40,0.40)), (1,9,1,3,(0.40,0.40,0.40)), (1,10,1,3,(0.40,0.40,0.40)), (1,11,1,3,(0.40,0.40,0.40)) |
| P2 | SP2-1 | 3 | (0.60, 0.60, 0.60) | (4,3,3,1,(0.60,0.60,0.60)), (5,3,3,1,(0.60,0.60,0.60)), (6,3,3,1,(0.60,0.60,0.60)), (7,3,3,1,(0.60,0.60,0.60)), (8,3,3,1,(0.60,0.60,0.60)), (9,3,3,1,(0.60,0.60,0.60)), (10,3,3,1,(0.60,0.60,0.60)) |
| P2 | SP2-2 | 3 | (0.60, 0.60, 0.60) | (10,3,3,1,(0.60,0.60,0.60)), (11,3,3,1,(0.60,0.60,0.60)), (12,3,3,1,(0.60,0.60,0.60)), (13,3,3,1,(0.60,0.60,0.60)), (14,3,3,1,(0.60,0.60,0.60)), (15,3,3,1,(0.60,0.60,0.60)), (16,3,3,1,(0.60,0.60,0.60)) |
| P2 | SP2-3 | 3 | (0.60, 0.60, 0.60) | (10,3,3,3,(0.60,0.60,0.60)), (10,4,3,3,(0.60,0.60,0.60)), (10,5,3,3,(0.60,0.60,0.60)), (10,6,3,3,(0.60,0.60,0.60)), (10,7,3,3,(0.60,0.60,0.60)), (10,8,3,3,(0.60,0.60,0.60)), (10,9,3,3,(0.60,0.60,0.60)), (10,10,3,3,(0.60,0.60,0.60)), (10,11,3,3,(0.60,0.60,0.60)) |

Stroke Vector List 315

FIG. 3K

STROKE BASED SKELETONIZER

BACKGROUND

An image may include hand-drawn graphics (e.g., text and non-text objects) composed of multiple strokes from a pen, marker, or the like. For example, the image may be a scan of a hand-drawn page. As another example, the image may be a photograph of a writing board on which graphics have been drawn. These strokes are rarely straight, making it difficult for image processing devices to determine the geometry of the hand-drawn graphics. These strokes also make it difficult to generate a high-level representation of the hand-drawn graphics that can be included in an electronic document (e.g., word processing document, spreadsheet, slide show, webpage, etc.). Regardless, users still wish to have image processing devices operate on hand-drawn graphics or any graphics in an image.

SUMMARY

In general, in one aspect, the invention relates to a method for processing a stroke in an image. The stroke comprising a plurality of pixels and the method comprises: executing a modified 4-way stroke width transform (SWT) on a mask of the stroke; determining a plurality of certain centerline points among the pixels based on the modified SWT; generating a plurality of polylines within the stroke based on the certain centerline points, wherein each of the polylines is formed of contiguous certain centerline points; determining a plurality of regions of certainty based on the polylines; removing the regions of certainty from the mask and leaving a plurality of regions of uncertainty in the mask; calculating a plurality of joints and end caps for each of the polylines based on the polylines and the regions of uncertainty; generating a completed polyline path by connecting the polylines based on the joints and end caps; and generating a description of the stroke based on the completed polyline path.

In general, in one aspect, the invention relates to a system for processing a stroke in an image, and the stroke comprising a plurality of pixels. The system comprising: a memory; a computer processor connected to the memory that: executes a modified 4-way stroke width transform (SWT) on a mask of the stroke; determines a plurality of certain centerline points among the pixels based on the modified SWT; generates a plurality of polylines within the stroke based on the certain centerline points, wherein each of the polylines is formed of contiguous certain centerline points; determines a plurality of regions of certainty based on the polylines; removes the regions of certainty from the mask and leaves a plurality of regions of uncertainty in the mask; calculates a plurality of joints and end caps for each of the polylines based on the polylines and the regions of uncertainty; generates a completed polyline path by connecting the polylines based on the joints and end caps; and generates a description of the stroke based on the completed polyline path.

In general, in one aspect, the invention relates to a non-transitory computer readable medium (CRM) storing computer readable program code for processing a stroke in an image, the stroke comprising a plurality of pixels, embodied therein. The program code, when executed: executes a modified 4-way stroke width transform (SWT) on a mask of the stroke; determines a plurality of certain centerline points among the pixels based on the modified SWT; generates a plurality of polylines within the stroke based on the certain centerline points, wherein each of the polylines is formed of contiguous certain centerline points; determines a plurality of regions of certainty based on the polylines; removes the regions of certainty from the mask and leaves a plurality of regions of uncertainty in the mask; calculates a plurality of joints and end caps for each of the polylines based on the polylines and the regions of uncertainty; generates a completed polyline path by connecting the polylines based on the joints and end caps; and generates a description of the stroke based on the completed polyline path.

Other aspects of the invention will be apparent from the following description and the appended claims.

BRIEF DESCRIPTION OF DRAWINGS

FIGS. 3A-3K show an implementation example in accordance with one or more embodiments of the invention.

DETAILED DESCRIPTION

Figure 1:
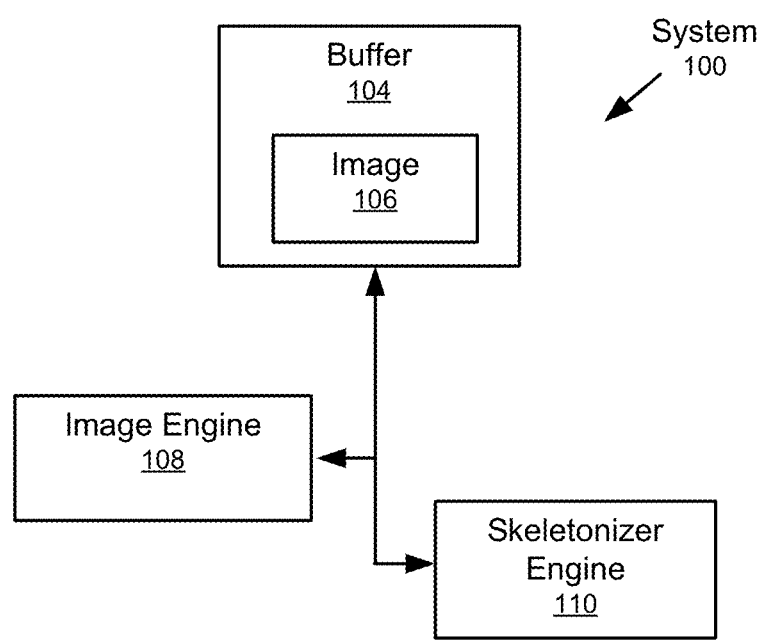
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method, a non-transitory computer readable medium (CRM), and a system of image processing for detecting hand-drawn and/or computer-generated lines (i.e., strokes) in an image. Specifically, an image including one or more graphics (e.g., text and non-text objects) composed of one or more strokes (i.e., one or more connected components that can be drawn without lifting the pen/marker) is obtained. The image is converted into a mask that highlights each pixel of the strokes in the image. One or more processes are executed on the strokes to identify a skeleton for each stroke. With the skeleton for each stroke identified, a high-level representation of the graphics comprising the strokes may be generated using one or more other image processing methods for inclusion of the stroke in an electronic document (e.g., OOXML document, PDF document, etc.).

FIG. 1 shows a system (100) in accordance with one or more embodiments of the invention. As shown in FIG. 1, the system (100) has multiple components, including, for example, a buffer (104), an image engine (108), and a skeletonizer engine (110). Each of these components (104, 108, 110) may be located on the same computing device (e.g., personal computer (PC), laptop, tablet PC, smart phone, multifunction printer, kiosk, server, etc.) or on different computing devices connected by a network of any size having wired and/or wireless segments. Each of these components is discussed below.

In one or more embodiments of the invention, the buffer (104) may be implemented in hardware (i.e., circuitry), software, or any combination thereof. The buffer (104) is configured to store an image (106) including one or more text and/or non-text graphics (e.g., a table, a graph, a text character, a shape, etc.) composed of one or more strokes. The image (106) may be obtained (e.g., downloaded, scanned, etc.) from any source. Further, the image (106) may be of any size and in any format (e.g., JPEG, GIF, BMP, PNG, etc.). In one or more embodiments, the image (106) includes a writing board (e.g., blackboard, whiteboard, etc.), and the graphics are drawn on the writing board with a marker.

In one or more embodiments of the invention, the image engine (108) may be implemented in hardware (i.e., circuitry), software, or any combination thereof. The image engine (108) converts the image (106) to a mask (e.g., a binary image) in order to facilitate the identification of strokes in the text and/or non-text graphics. In one or more embodiments, the mask generated by the image engine (108) pixelates the strokes in the image (106). Each stroke in the image (106) is pixelated to include pixels that represent a centerline of each stroke (i.e., an imaginary line that cuts through the center of each stroke). The pixels that make up the centerline of each stroke in the image (106) will be used to generate the stroke skeletons.

Those skilled in the art, having the benefit of this detailed description, will appreciate that a standard coordinate system for the image (106) may exist. However, if the strokes are rotated within the image (106), the axes of this standard coordinate system might not align with an angle of the strokes. In one or more embodiments of the invention, the image engine (108) establishes a custom coordinate system with perpendicular axes that closely align with the angle of the strokes in the image (106). Alternatively, the image may be rotated to better align the strokes with the standard coordinate system of the image (106). Alternatively, the image (106) may not be rotated and the custom coordinate system may not be established, and the original angle of the strokes is used in reference with the standard coordinate system.

In one or more embodiments of the invention, the skeletonizer engine (110) may be implemented in hardware (i.e., circuitry), software, or any combination thereof. The skeletonizer engine (110) is configured to process, analyze, and generate a skeleton for one or more graphics (i.e., connected component marks) in the image (106). In other words, the skeletonizer engine (110) is configured to identify each stroke that makes up the graphics in the image (106).

In one or more embodiments of the invention, the skeletonizer engine (110) may apply a modified 4-way stroke width transform (SWT) on the mask of the image (106) to estimate a width of each stroke in the horizontal direction, the vertical direction, the +45 degrees direction, and the −45 degrees direction. The value of each pixel in the modified SWT applied mask (i.e., a stroke width image) may be referred to as a stroke width value and it represents the minimum pen width (i.e., a stroke distance) that could have created the corresponding pixel in the strokes of the image (106). This is shown in FIG. 3C.

In one or more embodiments of the invention, the skeletonizer engine (110) further generates a stroke orientation image of the mask during the execution of the modified SWT. The stroke orientation is an estimate of an orientation of each pixel of each stroke in the horizontal direction, the vertical direction, the +45 degrees direction, and the −45 degrees direction. The value of each pixel in the stroke orientation applied mask may be referred to as a stroke orientation value, and it represents the orientation of each pixel in the above described four directions. In one or more embodiments of the invention, a pixel of the stroke may have more than one stroke orientation value. These pixels include a minimum stroke distance that is a tie between the +45 degrees and −45 degrees directions. Alternatively, in the event of the tie between the +45 degrees and −45 degrees directions, the first stroke width that is determined by the skeletonizer engine (110) (i.e., the first calculated stroke width) is selected as the stroke width of the respective pixel. This is shown in FIG. 3D.

In one or more embodiments, the skeletonizer engine (110) further generates a stroke width centerline image based on the stroke width and stroke orientation values calculated for the stroke width and stroke orientation images. The stroke width centerline image identifies the most likely pixels that form a centerline (i.e., the pixels at the center) of the stroke. In one or more embodiments, depending on the geometry of the stroke, the centerline pixels of the stroke may not be contiguous. In one or more embodiments, identifying the centerline pixels during the execution of the SWT improves the accuracy of the determination of the center pixels within the stroke. This is shown in FIG. 3E.

In one or more embodiments of the invention, the skeletonizer engine (110) analyzes each center pixel of a stroke and determines a certainty of the centerline points among the plurality of center pixels. This is to determine whether a given centerline pixel is a "certain" (i.e., trusted) pixel for the best centerline of the stroke, or whether it is "uncertain" (i.e., untrusted) geometrically where the best centerline for a stroke should be. The skeletonizer engine (110) determines the certainty of the centerline points by calculating a consensus of orientation for each of the center pixels based on the three images generated by the modified SWT. In one or more embodiments of the invention, the consensus of orientation for a center pixel is calculated by comparing the stroke orientation value of the center pixel to the stroke orientation value of a nearest marked 8-pixel neighborhood (i.e., the stroke orientation of neighboring pixels) around the center pixel (i.e., the marked pixels that surround the selected center pixel by sharing a common border and/or corner with the center pixel). The stroke orientation value of all of the selected pixels is compared to determine if the stroke orientation value of the center pixel is part of a majority of stroke orientation values and that there are no orientations in the consensus region that are at right angles to each other. Pixels that have ambiguous orientation such as a pixel that could be either the vertical or horizontal orientations or either the +45 or −45 degree orientations, do not contribute to the consensus calculation (i.e., are not considered when comparing the stroke orientation value of the center pixel with the stroke orientation values of pixels that make up the nearest marked 8-pixel neighborhood) and are inherently (i.e., directly identified as) uncertain center pixels if these pixels are center pixels. In the event that the stroke orientation value of the center pixel is part of the majority, it is determined that the consensus of orientation of the center pixel exceeds a predetermined certainty threshold and the center pixel is determined to be a certain centerline point.

For example, in one or more embodiments, assume that a center pixel has a stroke orientation value of the vertical direction and that the vertical direction is the majority stroke orientation value. This center pixel is determined to be a certain centerline point. As another example, assume that a center pixel has a stroke orientation value of the vertical direction and that the vertical direction is not the majority stroke orientation value. This center pixel is not a certain centerline point.

As another example, in one or more embodiments, assume that: (1) a center pixel has a stroke orientation value of the vertical direction, (2) the vertical direction is the majority stroke orientation, and (3) two of the pixels in the nearest marked 8-pixel neighborhood are at right angles to each other (e.g., one pixel has a +45 degree orientation and another has a −45 degree orientation, or there is a pixel of the horizontal stroke orientation value). This center pixel is not a certain centerline point. As another example, assume that (1) a center pixel has a stroke orientation value of the vertical direction, (2) the vertical direction is the majority stroke orientation, (3) no two of the pixels in the nearest marked 8-pixel neighborhood are at right angles to each other (e.g., no pixel has a +45 degree orientation while another has a −45 degree orientation, or there are no pixels of the horizontal stroke orientation value), and (4) a pixel in the nearest marked 8-pixel neighborhood is an ambiguous pixel. The ambiguous pixel is not considered (i.e., removed) when determining the majority for the consensus of orientation and the center pixel is determined to be a certain centerline point.

In one or more embodiments of the invention, the skeletonizer engine (110) labels all certain centerline points within the centerline of the stroke as "certain center pixels" and all remaining centerline pixels as "uncertain center pixels." In one or more embodiments of the invention, if an uncertain pixel is a center pixel at a terminal end of the stroke and if that center pixel includes more than one stroke orientation value or if the stroke orientation values of the uncertain pixel are at right angles to each other, this uncertain pixel is not labeled as an uncertain pixel. Instead, any non-center pixels that are directly contacting this uncertain pixel are labeled as uncertain pixels. This will be described below in more detail in reference to FIG. 3F.

In one or more embodiments of the invention, the skeletonizer engine (110) generates sub-paths of high confidence (herein referred to as "polylines") within the centerline of the stroke. Each polyline includes one or more contiguous certain centerline points that are connected. Each polyline further includes the stroke width and stroke orientation values of each certain centerline point that makes up the polyline. In one or more embodiments of the invention, a contiguity neighborhood (i.e., a group of pixels) used to generate the polylines can be a neighborhood that includes regions of 5×5 or 7×7 pixels as long as the intervening pixels of the stroke (i.e., pixels between the center centerline points) are marked (i.e., present) in the mask generated by the image engine (108).

In one or more embodiments of the invention, the skeletonizer engine (110) determines regions of certainty within the stroke using the polylines. In one or more embodiments, a region of certainty includes all certain centerline points between the two terminal ends of a polyline and all pixels directly contacting these certain centerline points. The regions of certainty are regions determined by the skeletonizer engine (110) that include the skeleton of the stroke with a high confidence.

In one or more embodiments of the invention, the skeletonizer engine (110) will remove all regions of certainty from the mask of the stroke. The remaining regions of the mask of the stroke are then labeled as regions of uncertainty. The regions of uncertainty are regions determined by the skeletonizer engine (110) that may include the skeleton of the stroke. This will be described below in more detail in reference to FIG. 3H.

In one or more embodiments of the invention, the skeletonizer engine (110) analyzes each polyline in the stroke and determines a direction of connection for each terminal end of each polyline. The direction of connection for each terminal end of each polyline is an imaginary line that extends out of the terminal ends of each polyline in a same vertical or horizontal plane as each polyline.

In one or more embodiments of the invention, based on the direction of connection, the skeletonizer engine (110) selects two polylines within the same region of uncertainty that can be connected (i.e., that includes a potential connection) with the least amount of change in momentum, direction, and/or curvature. In one or more embodiments, the skeletonizer engine (110) may use at least one of a dot product, a curve fit, and/or a change in linear or angular momentum calculation to calculate the amount of change in momentum, direction, and/or curvature between the two polylines. Based on the amount of change in momentum, direction, and/or curvature between the two polylines, the skeletonizer engine (110) calculates the most likely (i.e., the potential) path (i.e., joint) between the two polylines. In one or more embodiments, the most likely path may include, for example, a straight-line fit, a line-to-line intersection, a curve fit, etc., between the two selected polylines. For example, a straight-line fit will have a smaller amount of change in momentum, direction, and/or curvature than a line-to-line intersection connection, and a line-to-line intersection connection will have a smaller amount of change in momentum, direction, and/or curvature than a curve fit.

In one or more embodiments of the invention, the skeletonizer engine (110) removes the two selected polylines from further consideration once the most likely path has been calculated. In one or more embodiments, the skeletonizer engine (110) repeats the above process for all remaining polylines within the region of uncertainty that includes the two selected polylines. In the event that the remaining polylines do not form any of the above most likely paths or if only a single polyline remains within that region of uncertainty, these polylines are intersected with the closest polyline, which may include the polyline formed by the connection of the two selected polylines.

In one or more embodiments of the invention, if a region of uncertainty includes only a single terminal end of a polyline, the skeletonizer engine (110) calculates an end cap for that region of uncertainty. In one or more embodiments, the skeletonizer engine (110) calculates the end cap by overlapping all pixels within that region of uncertainty with one or more end cap templates, which may include templates for a round end cap, a butt end cap, a square end cap, etc. The end cap template with the best match (i.e., a largest matching value) with the pixels of that region of uncertainty is selected as the end cap for that region of uncertainty. In one or more embodiments of the invention, the skeletonizer engine (110) extends the terminal end of the polyline within a region of uncertainty based on the end cap determined for that region of uncertainty. For example, for a polyline of stroke width w that enters a region of uncertainty determined as a square or round end cap, the terminal end of the polyline is extended until w/2 pixels before the last pixel (i.e., the terminal pixel) within that region of uncertainty. In the event that the result of w/2 is not an integer, the skeletonizer engine (110) may either round the value up or down to the nearest integer based on a general placement of the pixels in the graphics (i.e., the location of each pixel in the overall image). For example, assume that a polyline with a stroke width of w=3 enters a region of uncertainty determined as a square or round end cap, the polyline may be extended by 1 pixel in response to w/2=1.5 being rounded down to the closest integer. Alternatively, the polyline may be extended by 2 pixels in response to w/2=1.5 being rounded up to the closest integer. This will be described below in more detail in reference to FIG. 3I.

In one or more embodiments of the invention, once all polylines within the stroke have been connected and an end cap has been determined for each region of uncertainty with only a single polyline, the skeletonizer engine (110) labels the resulting polyline as a completed polyline path. This completed polyline path is identified as a sub-path (i.e., a bone) of the skeleton of the stroke. In one or more embodiments, based on the completed polyline path and the modified SWT, the skeletonizer engine (110) fills in pixels between the regions of uncertainty (i.e., the pixels that form the regions of certainty that were previously removed) and pixels within the regions of uncertainty to create a new mask for the stroke. In one or more embodiments, not all pixels within previous regions of uncertainty are filled-in by the skeletonizer engine (110).

In one or more embodiments of the invention, the skeletonizer engine (110) determines if any pixels within an area of uncertainty were not filled-in (i.e., unaccounted for) during the creation of the new mask. These pixels are identified by the skeletonizer engine (110) as remnant pixels. In one more embodiments, remnant pixels may be generated by one or more of a noise in the pen stroke, one or more strokes that are left over on the drawing surface, an emphasis on a junction (i.e., a marker such as a circle, square, diamond, etc., on a line of a graph), one or more extra pen strokes that are not resolved into a known shape model, or any imperfections in the stroke.

In one or more embodiments of the invention, the skeletonizer engine (110) compares a count of the remnant pixels (i.e., a cardinality of the remnant pixels) within an area of uncertainty with a predetermined remnant pixel threshold. In response to the count of the remnant pixels falling under the predetermined pixel threshold, the skeletonizer engine (110) removes the remnant pixels. In response to the count of the remnant pixels being equal to or exceeding the predetermined pixel threshold, the skeletonizer engine (110) performs at least one of the following functions: (A) create an image of only the remnant pixels and tie (i.e., associate) the remnant pixels with the rest of the pixels within the region of uncertainty; (B) create a remnant pixel image by connecting all of the pixels between the remnant pixels based on the original pixels in the region of uncertainty and tie (i.e., associate) the remnant pixel image with the rest of the pixels within the region of uncertainty; or (C) create a remnant pixel image by connecting all of the pixels between the remnant pixels based on the original pixels in the region of uncertainty, generating a description of an outline of the remnant pixel image based on a vector graphic (e.g., ellipse, box, general polygon, etc.), and tying (i.e., associate) the remnant pixel image with the rest of the pixels within the region of uncertainty. This is described below in more detail in FIGS. 4A-4D.

In one or more embodiments of the invention, the skeletonizer engine (110) generates a list of stroke vectors based on the completed polyline path and the modified SWT. A stroke vector is generated for each pixel that forms the completed polyline path and may be recorded in the format of: (x, y, stroke width value, stroke orientation value, pixel color). This is described below in more detail in FIG. 3K.

In one or more embodiments of the invention, the skeletonizer engine (110) generates a vector description based on the list of stroke vectors and a list of images and/or shapes as a description of the stroke based on the pixels within the new mask. In the event that remnant pixels were identified, the generated vector description also includes the remnant pixels after one of functions (A) to (C) above is applied to the remnant pixels.

Figure 2A:
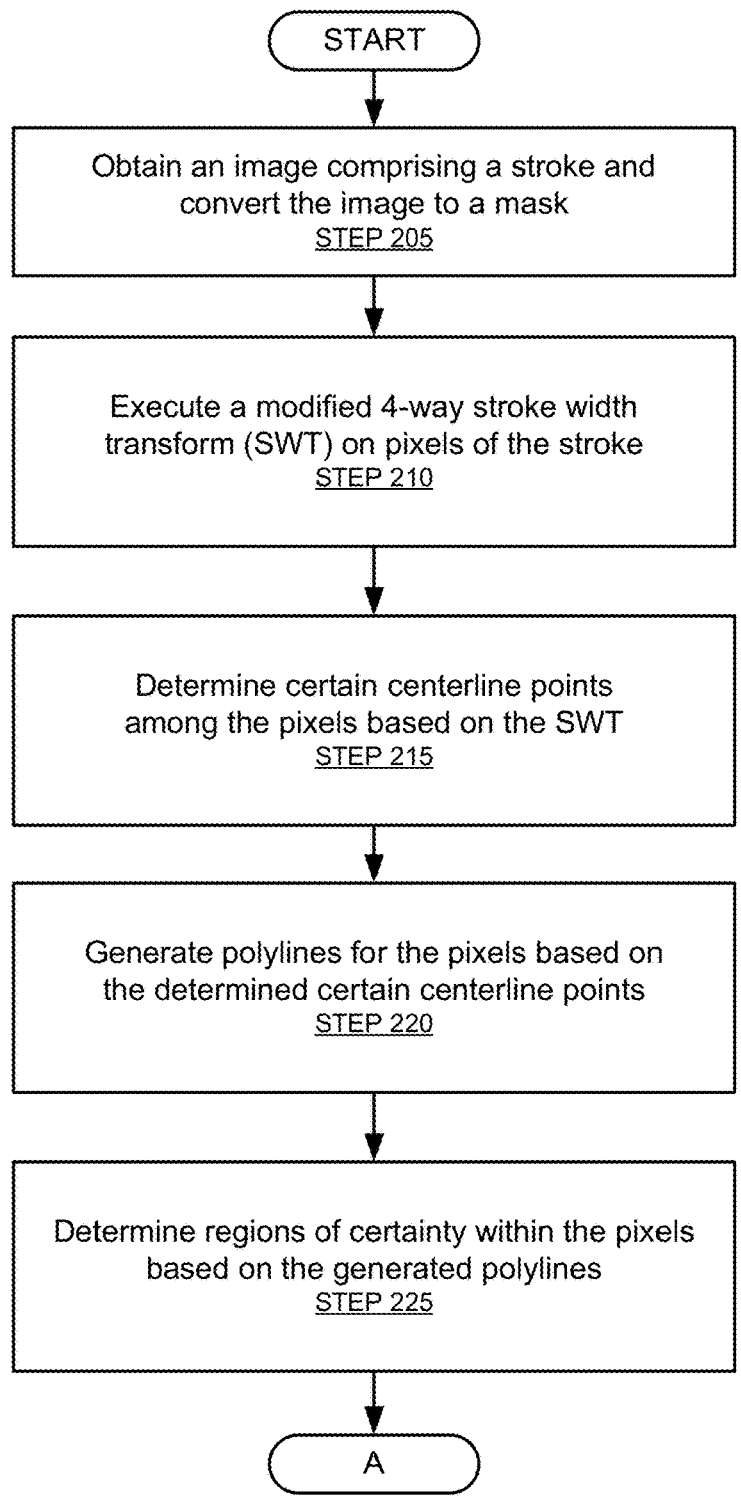
FIGS. 2A-2B show flowcharts in accordance with one or more embodiments of the invention.
Figure 2B:
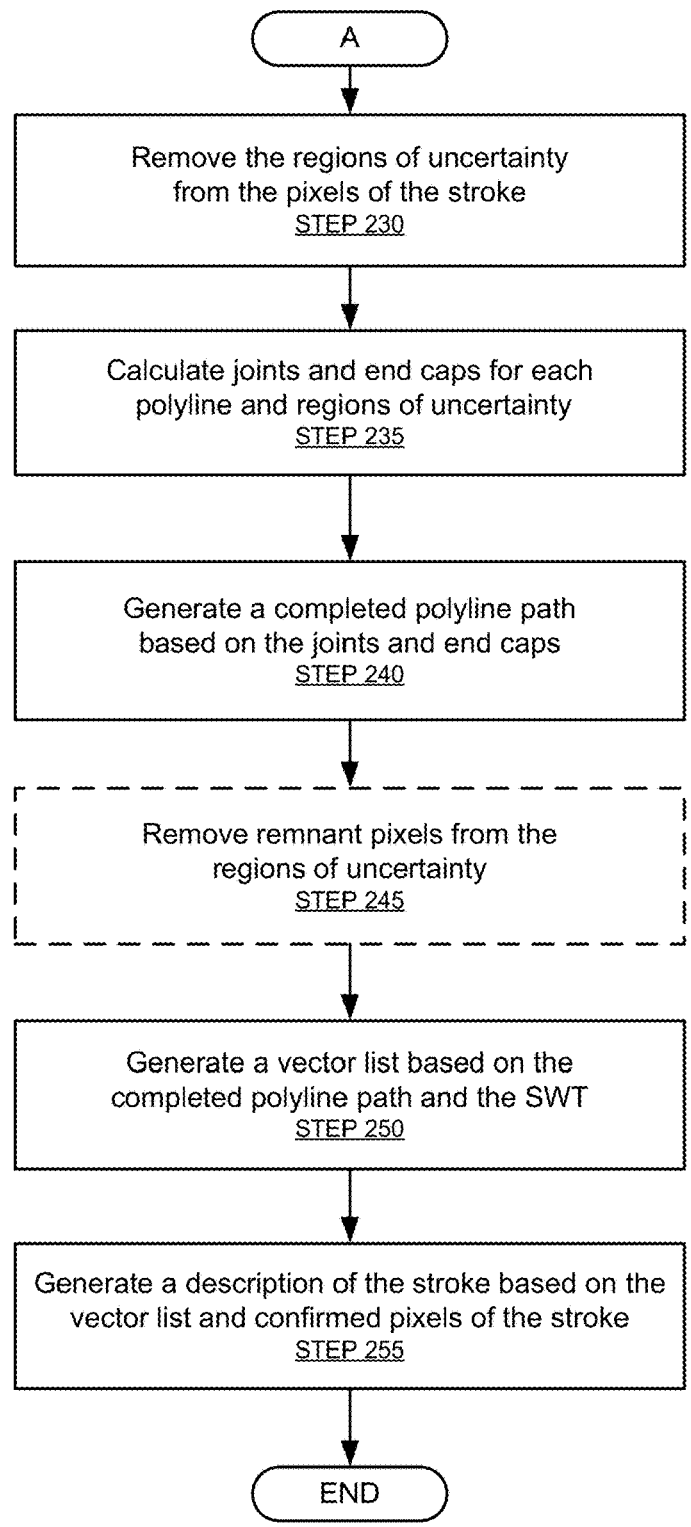

FIGS. 2A-2B show a flowchart in accordance with one or more embodiments of the invention. The flowchart depicts a process for image processing. Specifically, the flowchart depicts a process for detecting hand-drawn lines (i.e., strokes) in an image and to identify a skeleton for each stroke. One or more of the steps in FIGS. 2A-2B may be performed by the components of the system (100), discussed above in reference to FIG. 1. In one or more embodiments of the invention, one or more of the steps shown in FIG. 2A-2B may be omitted, repeated, and/or performed in a different order than the order shown in FIG. 2A-2B. Accordingly, the scope of the invention should not be considered limited to the specific arrangement of steps shown in FIG. 2A-2B.

Referring to FIG. 2A, initially, an image (106) including one or more graphics (e.g., text and/or non-text objects) is obtained (STEP 205). The image (106) may be obtained (e.g., downloaded, scanned, etc.) from any source and may be of any size or format. For example, the image (106) may include a writing board and the text and/or non-text graphics are hand-drawn on the writing board. Additionally or alternatively, the image (106) may be a scan of a hardcopy document, where the graphics are visible in the hardcopy document and the graphics were computer-generated.

In one or more embodiments of the invention, the image (106) is converted into a mask (e.g., a binary image) to identify text and/or non-text graphics within the image (106). Pixels corresponding to a graphic may be set to 1, while all remaining pixels are set to 0. Further, the custom coordinate system, as described above in reference to FIG. 1, may be established for the image (106). Alternatively, the image (106) may be rotated to better align an angle of the strokes with a standard coordinate system of the image (106). Alternatively, the image (106) is not rotated at all.

In STEP 210, as described above in reference to FIG. 1, a modified 4-way stroke width transform (SWT) is executed on the pixels of each stroke to estimate a width of each stroke in the horizontal direction, the vertical direction, the +45 degrees direction, and the −45 degrees direction. The value of each pixel in the modified SWT applied mask (i.e., a stroke width image) may be referred to as a stroke width value and it represents the minimum pen width (i.e., a stroke distance) that could have created the corresponding pixel in the strokes of the image (106). This is shown in FIG. 3C.

In one or more embodiments of the invention, a stroke orientation image of the mask is also generated during the execution of the modified SWT. The stroke orientation is the estimate of an orientation of each pixel of each stroke in the horizontal direction, the vertical direction, the +45 degrees direction, and the −45 degrees direction. The value of each pixel in the stroke orientation applied mask may be referred to as a stroke orientation value and it represents the orientation of each pixel in the above described four directions. In one or more embodiments of the invention, a pixel of the stroke may have more than one stroke orientation values. These pixels include a minimum stroke distance that is a tie between the +45 degrees and −45 degrees directions. Alternatively, in the event of the tie between the +45 degrees and −45 degrees directions, the first stroke width that is determined for the pixel (i.e., the first calculated stroke width) is selected as the stroke width of the respective pixel. This is shown in FIG. 3D.

In one or more embodiments, a stroke width centerline image based on the stroke width and stroke orientation values calculated for the stroke width and stroke orientation images is also generated during the execution of the modified SWT. The stroke width centerline image identifies the most likely pixels that form a centerline (i.e., the pixels at the center) of the stroke. In one or more embodiments, depending on the geometry of the stroke, the centerline pixels of the stroke may not be contiguous. In one or more embodiments, identifying the centerline pixels during the execution of the SWT improves the accuracy of the determination of the center pixels within the stroke. This is shown in FIG. 3E.

In STEP 215, as described above in reference to FIG. 1, certain centerline points among the pixels of the stroke are determined based on the modified SWT.

In STEP 220, as described above in reference to FIG. 1, polylines are generated for each stroke based on the determined certain centerline points.

In STEP 225, as described above in reference to FIG. 1, regions of certainty are determined within the pixels of the stroke based on the generated polylines.

In STEP 230, as described above in reference to FIG. 1, the regions of certainty are removed from the mask of the stroke leaving behind only regions of uncertainty in the mask.

In STEP 235, as described above in reference to FIG. 1, joints and end caps for each polyline and regions of uncertainty are calculated. In one or more embodiments of the invention, based on the direction of connection, two polylines within the same region of uncertainty that can be connected with the least amount of change in momentum, direction, and/or curvature are selected. In one or more embodiments, at least one of a dot product, a curve fit, and/or a change in linear or angular momentum calculation may be used to calculate the amount of change in momentum, direction, and/or curvature between the two polylines. Based on the amount of change in momentum, direction, and/or curvature between the two polylines, the most likely path (i.e., a joint) between the two polylines is calculated. In one or more embodiments, the most likely path may include, for example, a straight-line fit, a line-to-line intersection, a curve fit, etc., between the two selected polylines. For example, a straight-line fit will have a smaller amount of change in momentum, direction, and/or curvature than a line-to-line intersection connection, and a line-to-line intersection connection will have a smaller amount of change in momentum, direction, and/or curvature than a curve fit.

In one or more embodiments of the invention, the two selected polylines are removed from further consideration once the most likely path has been calculated. In one or more embodiments, the above process is repeated for all remaining polylines within the region of uncertainty that includes the two selected polylines. In the event that the remaining polylines do not form any of the above most likely paths or if only a single polyline remains within that region of uncertainty, these polylines are intersected with the closest polyline, which may include the polyline formed by the connection of the two selected polylines.

In one or more embodiments of the invention, if a region of uncertainty includes only a single terminal end of a polyline, an end cap for that region of uncertainty is calculated. In one or more embodiments, the end cap is calculated by overlapping all pixels within that region of certainty with one or more end cap templates, which may include templates for a round end cap, a butt end cap, a square end cap, etc. The end cap template with the best match (i.e., a largest matching value) with the pixels of that region of uncertainty is selected as the end cap for that region of uncertainty. In one or more embodiments of the invention, the terminal end of the polyline within a region of uncertainty is extended based on the end cap determined for that region of uncertainty. For example, for a polyline of stroke width w that enters a region of uncertainty determined as a square or round end cap, the terminal end of the polyline is extended until w/2 pixels before the last pixel (i.e., the terminal pixel) within that region of uncertainty. In the event that the result of w/2 is not an integer, the result of the calculation (i.e., the value of w/2) may be rounded up or down to the nearest integer based on a general placement of the pixels in the graphics (i.e., the location of each pixel in the overall image). For example, assume that a polyline with a stroke width of w=3 enters a region of uncertainty determined as a square or round end cap, the polyline may be extended by 1 pixel in response to w/2=1.5 being rounded down to the closest integer. Alternatively, the polyline may be extended by 2 pixels in response to w/2=1.5 being rounded up to the closest integer. This is shown in FIG. 3I.

In STEP 240, as described above in reference to FIG. 1, a completed polyline path is generated based on the joints and end caps. In one or more embodiments of the invention, once all polylines within the stroke have been connected and an end cap has been determined for each region of uncertainty with only a single polyline, the resulting polyline is labeled as a completed polyline path. This completed polyline path is identified as a sub-path (i.e., a bone) of the skeleton of the stroke. In one or more embodiments, based on the completed polyline path and the modified SWT, pixels between the regions of uncertainty (i.e., the pixels that form the regions of certainty that were previously removed) and pixels within the regions of uncertainty are filled-in to create a new mask for the stroke. In one or more embodiments, not all pixels within previous regions of uncertainty may be filled-in during the creation of the new mask.

In STEP 245, as described above in reference to FIG. 1, in the event that there are any remnant pixels within any of the regions of uncertainty, the remnant pixels are removed if a count of the remnant pixels (i.e., a cardinality of the remnant pixels) falls below a predetermined remnant pixel threshold. Alternatively, in response to the count of the remnant pixels being equal to or exceeding the predetermined pixel threshold, at least one of the following functions is executed: (A) creating an image of only the remnant pixels and tying (i.e., associating) the remnant pixels with the rest of the pixels within the region of uncertainty; (B) creating a remnant pixel image by connecting all of the pixels between the remnant pixels based on the original pixels in the region of uncertainty and tying (i.e., associating) the remnant pixel image with the rest of the pixels within the region of uncertainty; or (C) creating a remnant pixel image by connecting all of the pixels between the remnant pixels based on the original pixels in the region of uncertainty, generating a description of an outline of the remnant pixel image based on a vector graphic (e.g., ellipse, box, general polygon, etc.), and tying (i.e., associating) the remnant pixel image with the rest of the pixels within the region of uncertainty. This is shown in FIGS. 4A-4D.

In STEP 250, as described above in reference to FIG. 1, a vector list is generated based on the completed polyline path and the modified SWT.

In STEP 255, a description of the stroke is generated based on the vector list and the pixels (i.e., confirmed pixels)

in the new mask of the stroke. In one or more embodiments, in the event that remnant pixels were determined in STEP 245, the description of the stroke would take into account any data generated from the existence of the remnant pixels.

Figure 3A:
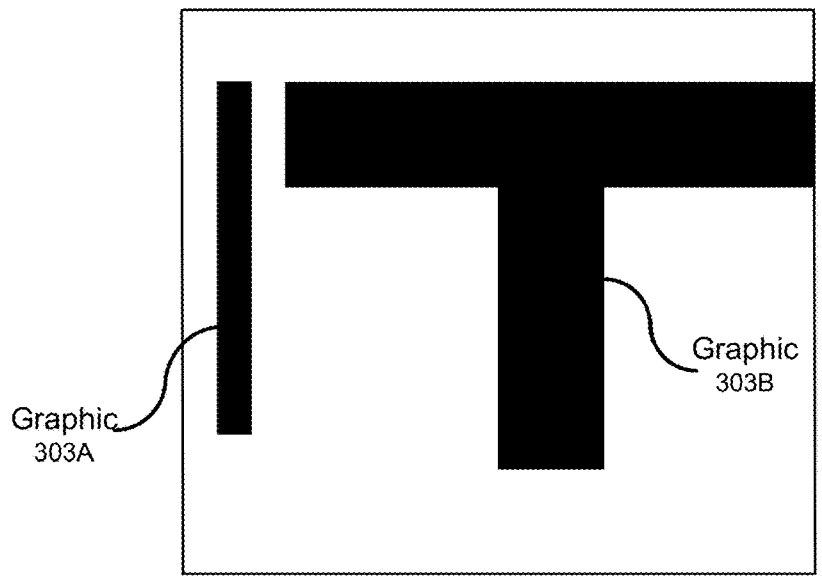
Figure 3B:
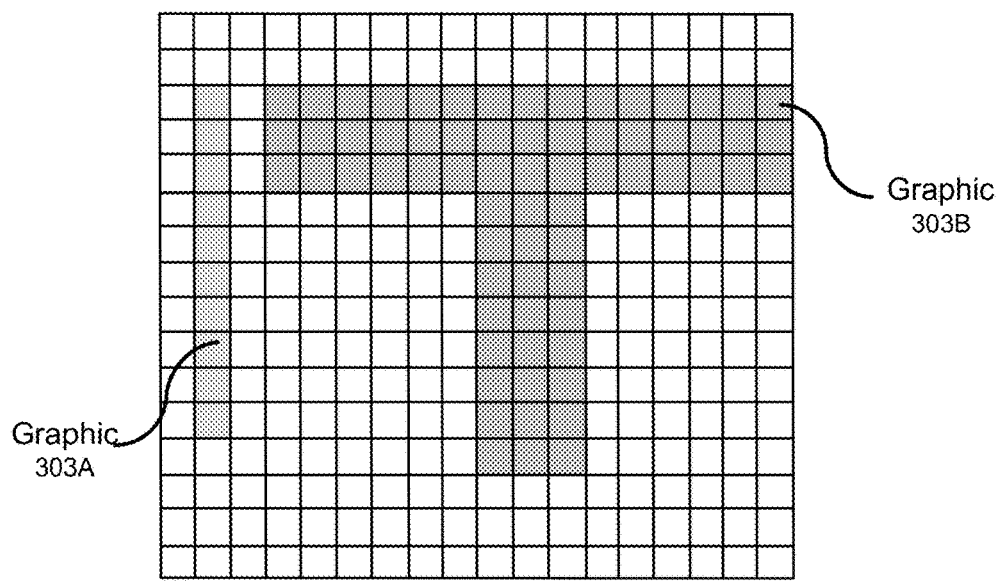
Figure 3C:
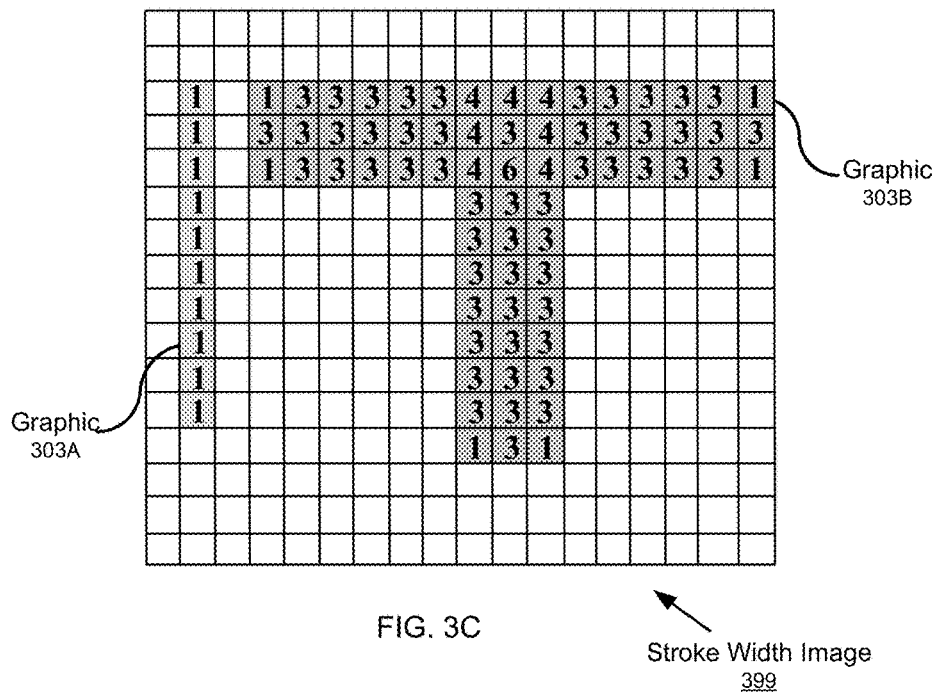
Figure 3D:
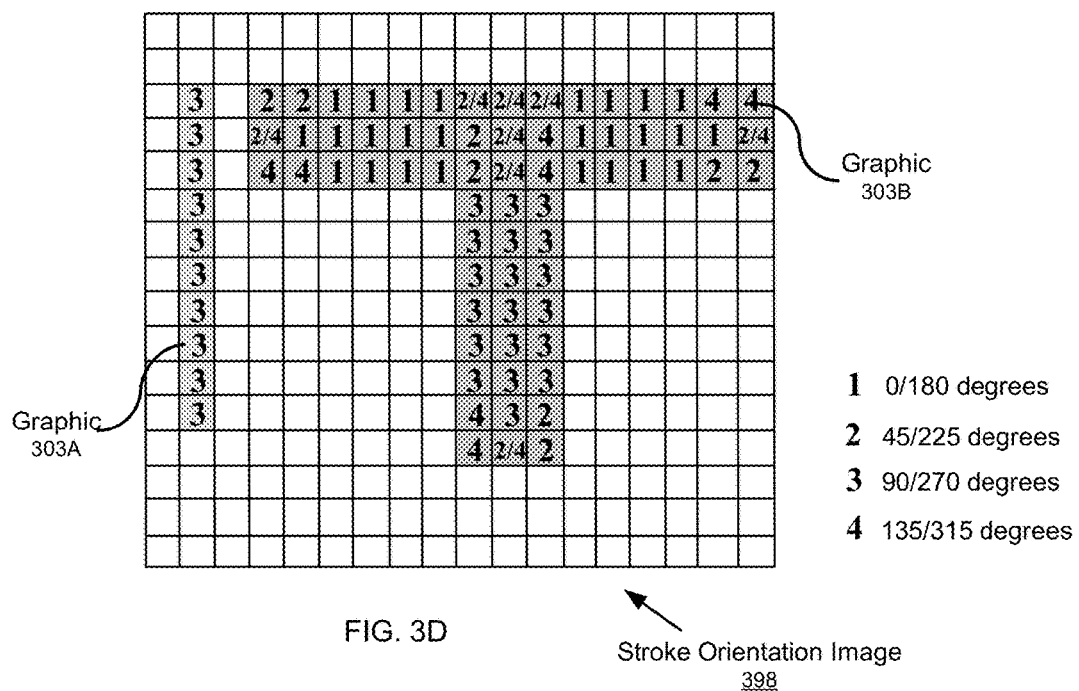
Figure 3E:
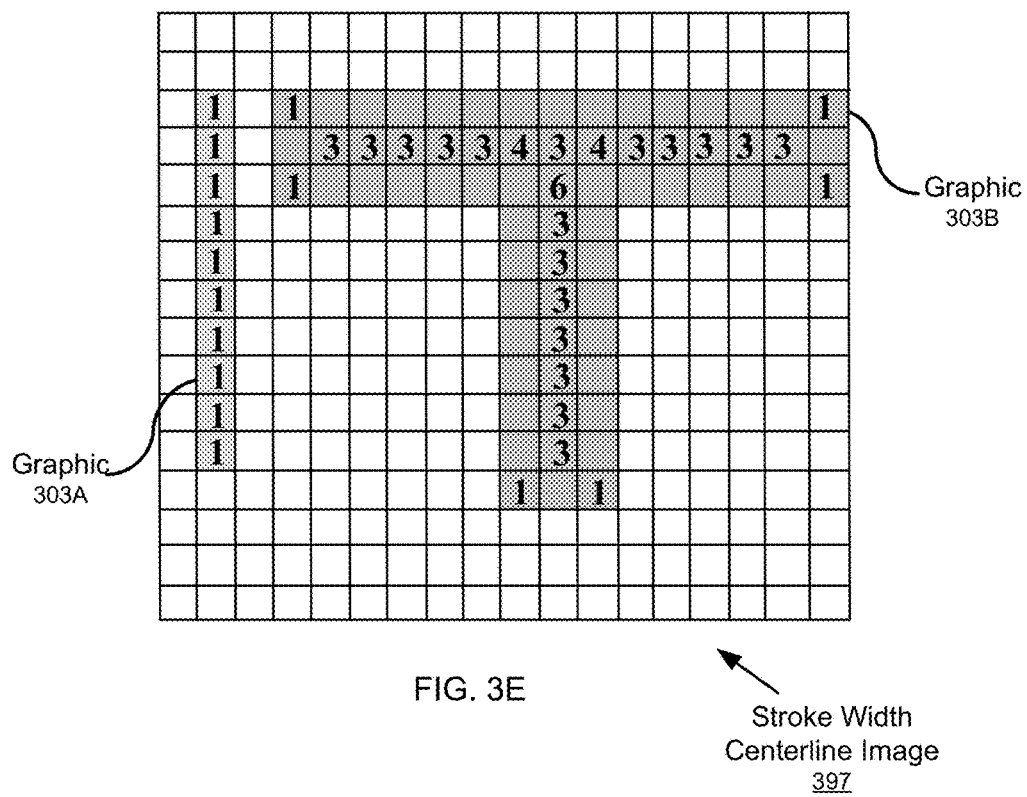
Figure 3F:
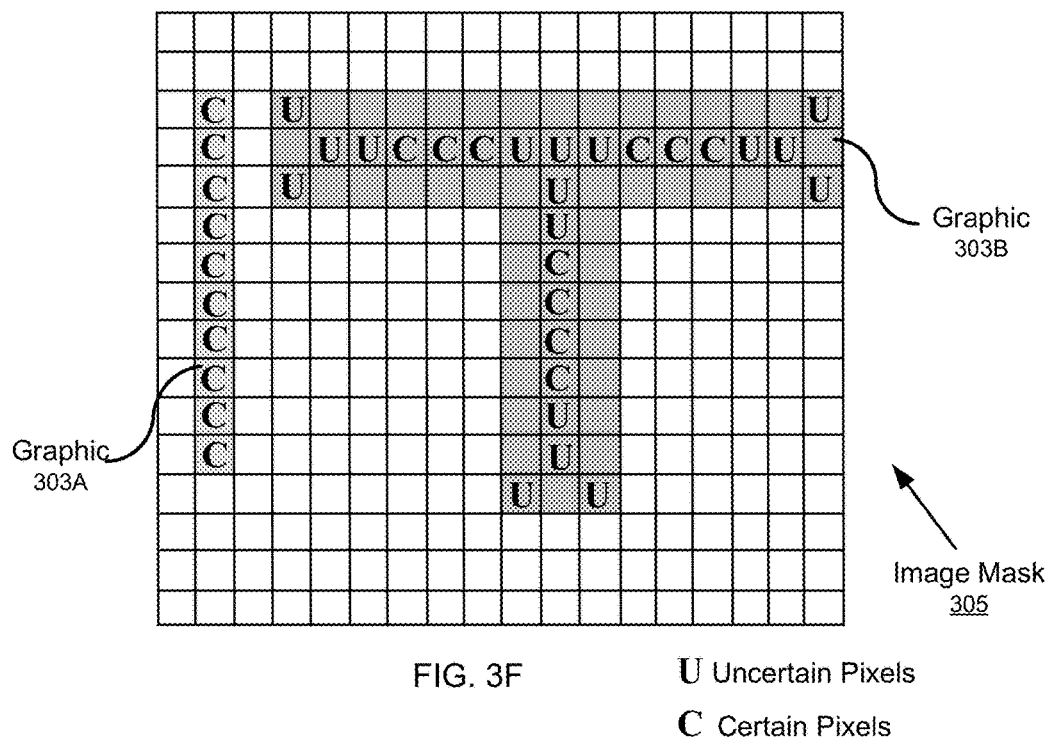
Figure 3G:
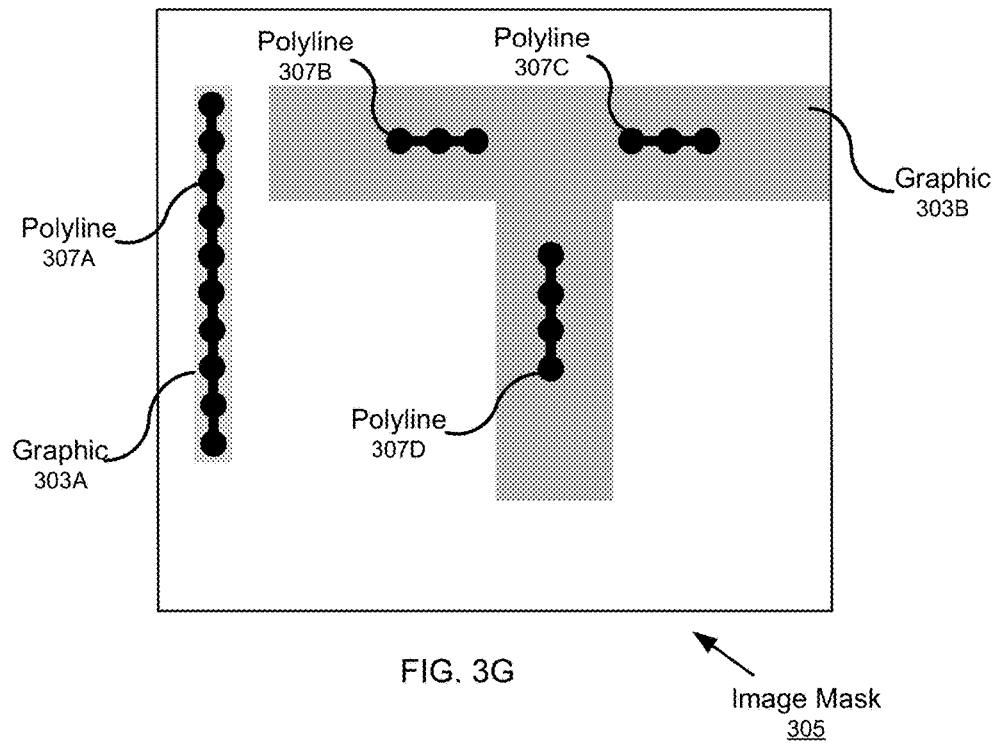
Figure 3H:
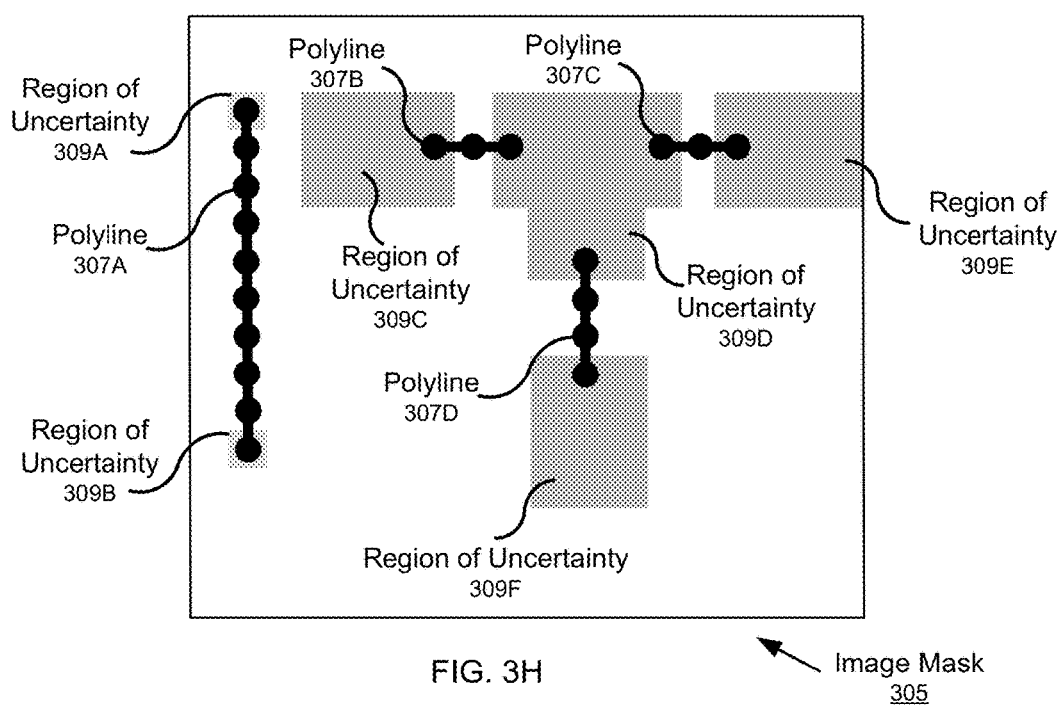
Figure 3I:
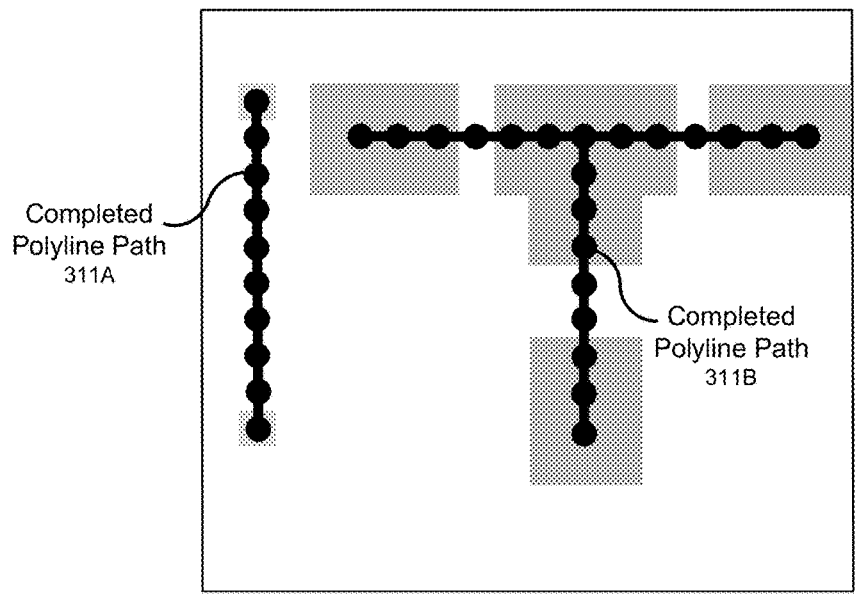

FIGS. 3A-3K show an implementation example in accordance with one or more embodiments of the invention. FIG. 3A shows an image (301) that includes two graphics (303A) and (303B). As seen in FIG. 3A, the graphic (303A) is a line (i.e., a non-text object) and graphic (303B) is the text object "T". In one or more embodiments, each graphic (303A, 303B) may be composed of one or more strokes.

FIG. 3B shows the image (301) after it has been converted to an image mask (305). The image mask (305) divides the graphics (303A, 303B) into a number of pixels (i.e., pixelates the graphics). In the example shown in FIG. 3B, the graphics (303A, 303B) includes odd number of pixels for ease of illustration of a center line. However, one or more embodiments of the present invention is not limited to this example. Furthermore, for purposes of illustration in this application only, the shading of the pixels for each of the graphics (303A, 303B) in FIG. 3B is different.

FIGS. 3C-3E show the image mask (305) after the application of the modified 4-way stroke width transform (SWT). As seen in FIG. 3C, a stroke width value is calculated for each pixel in the graphics (303A, 303B) to generate a stroke width image (399) for the image mask (305) of FIG. 3B. The stroke width value represents a minimum pen width (i.e., a stroke distance) that could have created the corresponding pixel in the strokes based on an estimate of a length of the stroke in the horizontal direction, the vertical direction, the +45 degrees direction, and the −45 degrees direction. The stroke width value may be any number greater than 0.

As seen in FIG. 3D, a stroke orientation value is calculated for each pixel in the graphics (303A, 303B) to generate a stoke orientation image (398) for the image mask (305) of FIG. 3B. A legend that provides what each stroke width orientation value represents is also provided. The stroke orientation value may be represented by any numerical and/or non-numerical characters. As further seen in FIG. 3D, some pixels may include more than one stroke orientation value. These pixels include a minimum stroke distance that is a tie between the +45 degrees and −45 degrees directions. Alternatively, in the event of the tie between the +45 degrees and −45 degrees directions, the first determined stroke distance (i.e., the first calculated stroke distance) is selected as the stroke distance of the respective pixel.

As seen in FIG. 3E, a stroke width centerline image (397) for the image mask (305) of FIG. 3B is generated based on the stroke width and stroke orientation values calculated for the stroke width and stroke orientation images (399, 398) to identify the most likely pixels that from the centerline of the strokes that make up the graphics (303A, 303B).

FIG. 3F shows the image mask (305) once all certain centerline points have been determined for the center pixels of the graphics (303A, 303B). As seen in FIG. 3F, all certain centerline points are labeled as "C" to represent a certain center pixel and all remaining center pixels are labeled as "U" to represent an uncertain center pixel. As further seen in FIG. 3E, all terminal end pixels of the graphic (303B) that includes more than one stroke orientation value or stroke orientation values that are at right angles to each other are not labeled as uncertain center pixels. Instead any non-center pixels that are directly contacting one or more borders (i.e., sides) of these uncertain pixels are labeled as uncertain center pixels.

FIG. 3G shows the image mask (305) after polylines (307A-307D) have been generated. As seen in FIG. 3G, the polylines (307A-307D) are generated by connecting contiguous certain center pixels within the graphics (303A, 303B).

FIG. 3H shows the image mask (305) after the regions of certainty have been removed from the mask of the graphics (303A, 303B) leaving only the regions of uncertainty (309A-309F). As described above in reference to FIG. 1, joints and end caps are calculated for each of the polylines (307A-307D) and regions of uncertainty (309A-309F), respectively. As seen in FIG. 3H, the regions of uncertainty (309A, 309B) are determined as butt end caps and the regions of uncertainty (309C, 309E, 309F) are determined as square end caps.

FIG. 3I shows the image mask (305) after all joints and end caps have been calculated for the polylines (307A-307D) and regions of uncertainty (309A-309F), respectively. As seen in FIG. 3I, completed polyline paths (311A, 311B) have been generated by connecting the polylines (307A-307D) and extending the terminal ends of the polylines (307A-307D) based on the end caps determined for each region of uncertainty (309A-309F). In the example shown in FIG. 3I, the stoke widths of each polyline (307B-307D) is 3, and the value of w/2 is rounded down from 1.5 to 1. Therefore, the polylines (307B-307D) have been extended until 1 pixel before the terminal pixel of the graphic (303B).

Figure 3J:
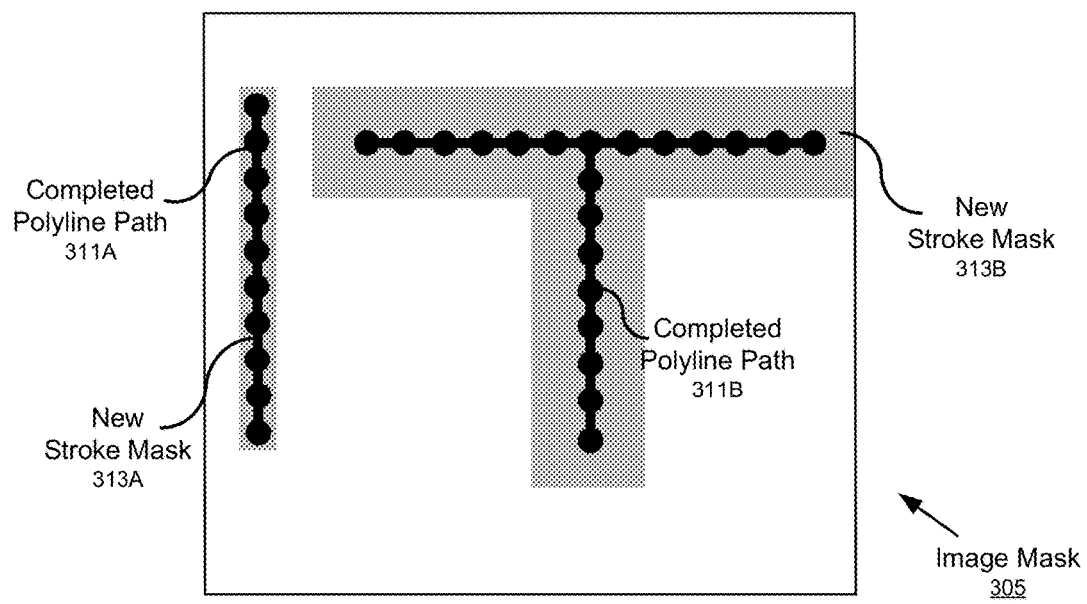

FIG. 3J shows the image mask (305) after new stroke masks (313A, 313B) have been generated based on the completed polyline paths (311A, 311B). As seen in FIG. 3J, there are no pixels unaccounted for (i.e., no remnant pixels) within the pixels of the original graphics (303A, 303B) after the generation of the new stroke masks (313A, 313B).

FIG. 3K shows a stroke vector list (315) generated for the image mask (305) based on the completed polyline paths (311A, 311B) and the new stroke masks (313A, 313B). As seen in FIG. 3K, the completed polyline path (311B) is divided into three individual sub-paths SP2-1, SP2-2, and SP2-3. Each of these sub-paths represents a potential stroke that may form the new stroke mask (313B). This stroke vector list (315) can be used by other image processing methods to include the original graphics (303A, 303B) in an electronic document (e.g., OOXML document, PDF document, etc.).

In one or more embodiments, the stroke vector list is generated on the assumption that the coordinate of the top left pixel is (0,0). As seen in the example of FIG. 3K, the stroke orientation values of the pixels of the completed polyline path (311B) that are part of the calculated joints are different from the original stroke orientation values shown in FIG. 3D. The stroke orientation values of these pixels are directly based on the stoke orientation values of the original certain pixels. For example, the original stroke orientation value for the pixel at (10,3) in FIG. 3D of "2/4" was disregarded and a new stroke orientation value of "3", which matches the stroke orientation of the certain pixels (e.g., pixels (10,6), (10,7), (10,8), (10,9)), is assigned to this pixel.

Figure 4A:
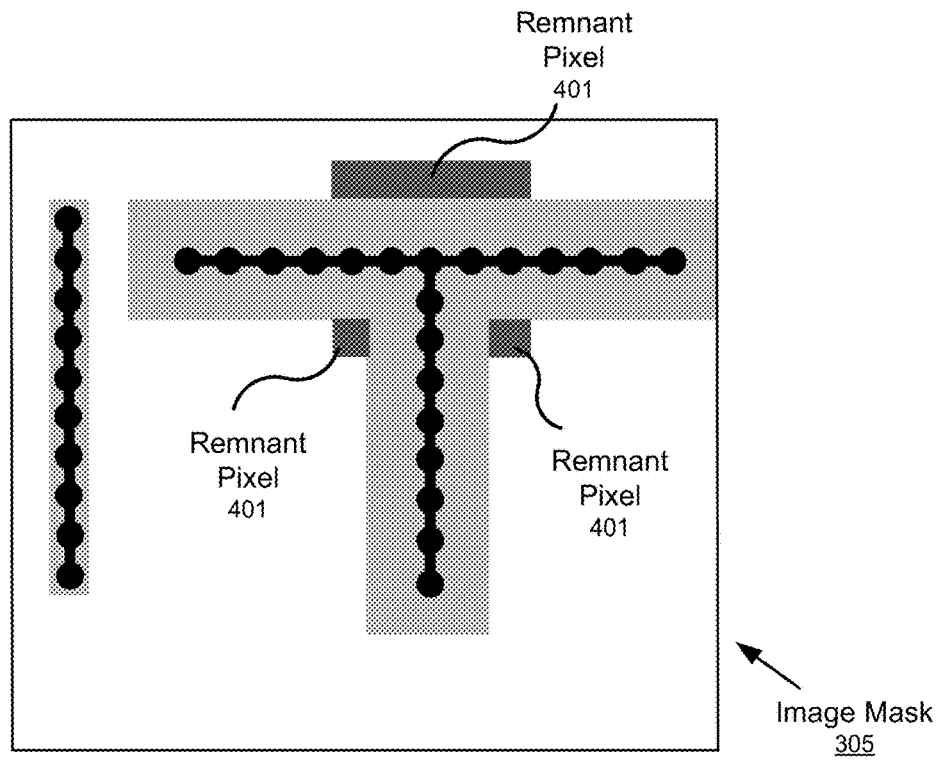
FIGS. 4A-4D show an implementation example in accordance with one or more embodiments of the invention.
Figure 4B:
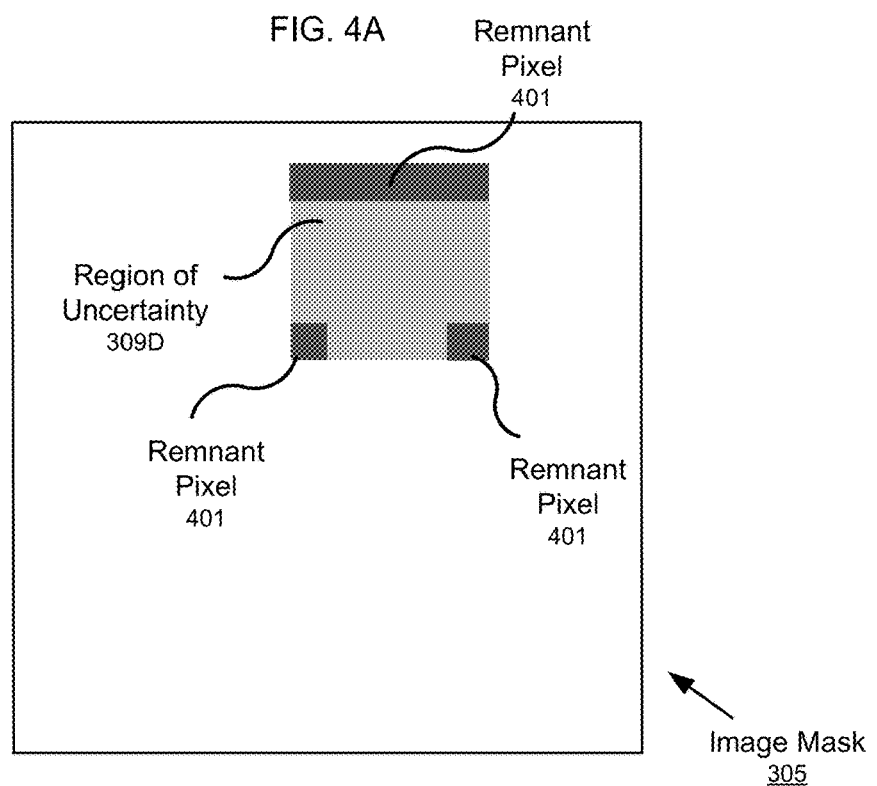
Figure 4C:
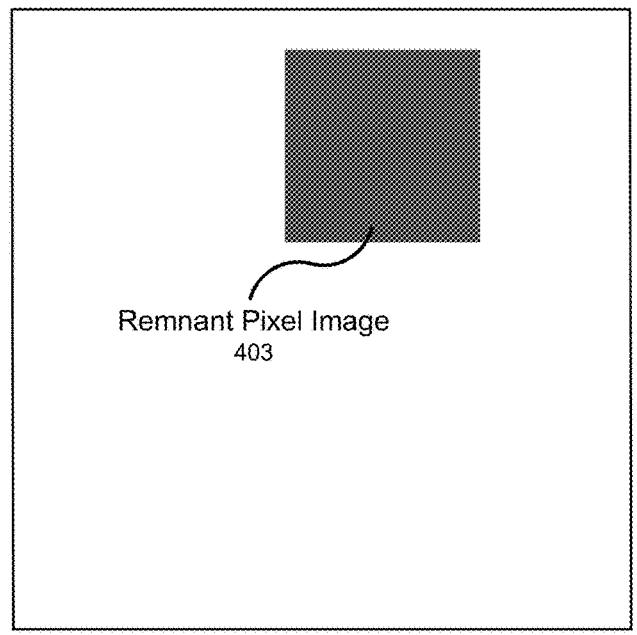
Figure 4D:
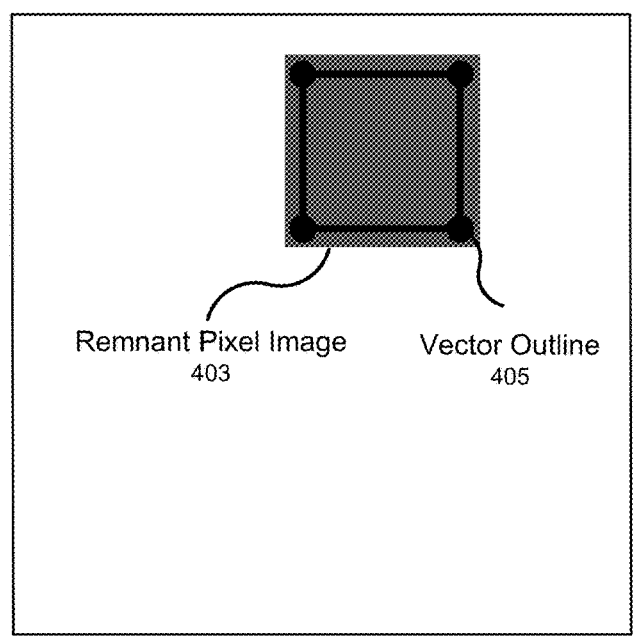

FIGS. 4A-4D show an implementation example in accordance with one or more embodiments of the invention. As seen in FIG. 4A, an example is shown where one or more regions of uncertainty that make up the new stroke masks (313A, 313B) in FIG. 3J include remnant pixels (401). In this example of one or more embodiments, the count of the remnant pixels (401) exceeds the predetermined threshold remnant pixel value. In response, the functions (A) to (C) described above in reference to FIG. 1 are executed and the results are shown in FIGS. 4B-4D, respectively.

FIG. 4B shows an example of the image mask (305) upon the execution of function (A). As seen in FIG. 4B, an image consisting of only the remnant pixels (401) is created and tied to (i.e., associated with) the region of uncertainty (309D) previously shown in FIG. 3G.

FIG. 4C shows an example of the image mask (305) upon the execution of function (B). As seen in FIG. 4C, a remnant pixel image (403) is generated by connecting all of the pixels between the remnant pixels based on the original pixels in the region of uncertainty (309D). The remnant pixel image (403) is then tied to (i.e., associated with) the rest of the pixels of the region of uncertainty (309G).

FIG. 4D shows an example of the image mask (305) upon the execution of function (C). As seen in FIG. 4D, the remnant pixel image (403) is generated and a vector outline (405) of the remnant pixel image (403) is shape-matched to a vector graphic (e.g., ellipse, box, general polygon, etc.). The remnant pixel image (403) is then tied to (i.e., associated with) the rest of the pixels of the region of uncertainty (309G).

Figure 5:
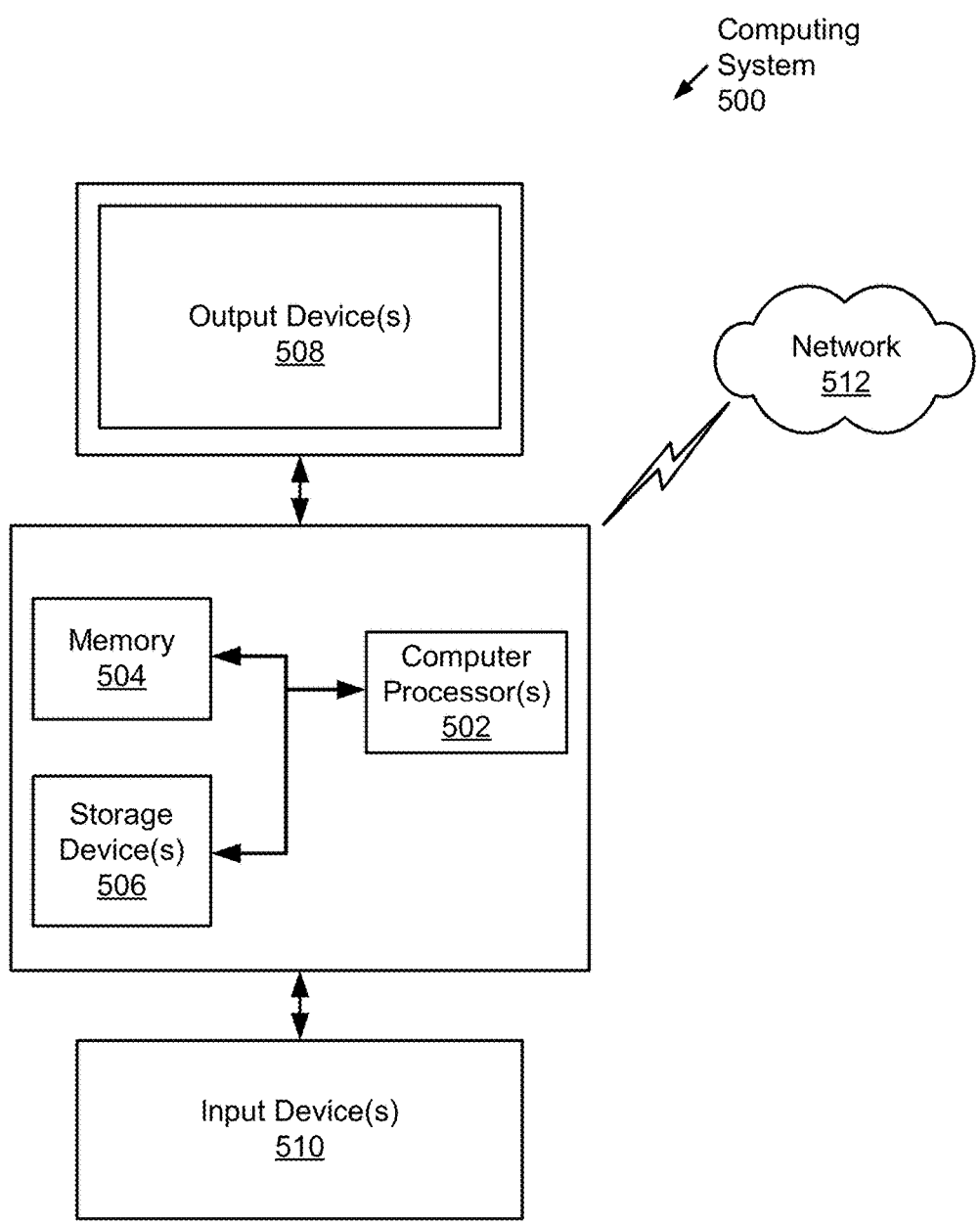
FIG. 5 shows a computing system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 5, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (500) may be located at a remote location and be connected to the other elements over a network (512). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing a stroke in an image, the stroke comprising a plurality of pixels and the method comprising:
   executing a modified 4-way stroke width transform (SWT) on a mask of the stroke;
   determining a plurality of certain centerline points among the pixels based on the modified SWT;
   generating a plurality of polylines within the stroke based on the certain centerline points, wherein each of the polylines is formed of contiguous certain centerline points;
   determining a plurality of regions of certainty based on the polylines;
   removing the regions of certainty from the mask and leaving a plurality of regions of uncertainty in the mask;
   calculating a plurality of joints and end caps for each of the polylines based on the polylines and the regions of uncertainty;
   generating a completed polyline path by connecting the polylines based on the joints and end caps; and
   generating a description of the stroke based on the completed polyline path.

2. The method of claim 1, wherein executing the modified SWT on the mask of the stroke comprises:
   generating a stroke width image, a stroke orientation image, and a stroke width centerline image of the stroke based on an orientation of each of the pixels,
   wherein the orientation of each of the pixels is based on a predetermined coordinate system of the image.

3. The method of claim 2, wherein determining the certain centerline points for the stroke comprises:
   calculating a consensus of orientation for a center pixel among the pixels based on comparing an orientation of the center pixel to an orientation of each neighboring pixel that surrounds the center pixel on the stroke orientation using the stroke orientation of the stroke; and
   determining that the center pixel is a certain centerline point among the certain centerline points in response to the consensus of orientation exceeding a predetermined certainty threshold.

4. The method of claim 1, wherein
the regions of certainty include all pixels among the pixels that surround all certain centerline points between terminal ends of each of the polylines, and
the regions of uncertainty include all remaining pixels among the plurality of pixels.

5. The method of claim 1, wherein calculating the joints comprises:
determining two polylines among the polylines with a potential connection under a predetermined maximum change threshold;
calculating a potential path between the two polylines based on the potential connection between the two polylines; and
removing the two polylines from further consideration,
wherein the potential path between the two polylines is at least selected from a group consisting of: a straight-line, a perpendicular intersection, a corner intersection, a line-to-line intersection, and a curve fit.

6. The method of claim 1, wherein calculating the end caps comprises:
selecting a region of uncertainty among the regions of uncertainty that comprises only a single polyline among the polylines;
overlapping a plurality of end cap templates over an entirety of the region of uncertainty and calculating a matching value for each of the end cap templates based on the overlapping;
selecting an end cap for the region of uncertainty based on an end cap template with the largest matching value; and
altering a length of the polyline based on the selected end cap,
wherein the plurality of end caps comprises a square end cap, a butt end cap, and a round end cap.

7. The method of claim 1, further comprising
recreating the mask by connecting the regions of uncertainty based on the completed polyline path and the modified SWT.

8. The method of claim 1, further comprising:
determining a region of uncertainty, among the plurality of regions of uncertainty, that includes remnant pixels;
removing the remnant pixels in response to a cardinality of the remnant pixels falling below a predetermined remnant pixel threshold;
generating an image of the remnant pixels and associating the remnant pixels with the region of uncertainty in response to the cardinality of the remnant pixels exceeding the predetermined remnant pixel threshold,
wherein the description of the stroke further comprises a remnant pixel information based on the association.

9. The method of claim 1, wherein the image comprises a writing board, and the stroke is a hand-drawn graphic on the writing board with a marker.

10. A non-transitory computer readable medium (CRM) storing computer readable program code for processing a stroke in an image, the stroke comprising a plurality of pixels, embodied therein that:
executes a modified 4-way stroke width transform (SWT) on a mask of the stroke;
determines a plurality of certain centerline points among the pixels based on the modified SWT;
generates a plurality of polylines within the stroke based on the certain centerline points, wherein each of the polylines is formed of contiguous certain centerline points;
determines a plurality of regions of certainty based on the polylines;
removes the regions of certainty from the mask and leaves a plurality of regions of uncertainty in the mask;
calculates a plurality of joints and end caps for each of the polylines based on the polylines and the regions of uncertainty;
generates a completed polyline path by connecting the polylines based on the joints and end caps; and
generates a description of the stroke based on the completed polyline path.

11. The non-transitory CRM of claim 10, wherein executing the modified SWT on the mask of the stroke comprises:
generating a stroke width image, a stroke orientation image, and a stroke width centerline image of the stroke based on an orientation of each of the pixels,
wherein the orientation of each of the pixels is based on a predetermined coordinate system of the image.

12. The non-transitory CRM of claim 11, wherein determining the certain centerline points for the stroke comprises:
calculating a consensus of orientation for a center pixel among the pixels based on comparing an orientation of the center pixel to an orientation of each neighboring pixel that surrounds the center pixel on the stroke orientation using the stroke orientation of the stroke; and
determining that the center pixel is a certain centerline point among the certain centerline points in response to the consensus of orientation exceeding a predetermined certainty threshold.

13. The non-transitory CRM of claim 10, wherein
the regions of certainty include all pixels among the pixels that surround all certain centerline points between terminal ends of each of the polylines, and
the regions of uncertainty include all remaining pixels among the plurality of pixels.

14. The non-transitory CRM of claim 10, wherein calculating the joints comprises:
determining two polylines among the polylines with a potential connection under a predetermined maximum change threshold;
calculating a potential path between the two polylines based on the potential connection between the two polylines; and
removing the two polylines from further consideration,
wherein the potential path between the two polylines is at least selected from a group consisting of: a straight-line, a perpendicular intersection, a corner intersection, a line-to-line intersection, and a curve fit.

15. The non-transitory CRM of claim 10, wherein the image comprises a writing board, and the stroke is a hand-drawn graphic on the writing board with a marker.

16. A system for processing a stroke in an image, the stroke comprising a plurality of pixels, the system comprising:
a memory;
a computer processor connected to the memory that:
executes a modified 4-way stroke width transform (SWT) on a mask of the stroke;
determines a plurality of certain centerline points among the pixels based on the modified SWT;
generates a plurality of polylines within the stroke based on the certain centerline points, wherein each of the polylines is formed of contiguous certain centerline points;
determines a plurality of regions of certainty based on the polylines;

removes the regions of certainty from the mask and leaves a plurality of regions of uncertainty in the mask;

calculates a plurality of joints and end caps for each of the polylines based on the polylines and the regions of uncertainty;

generates a completed polyline path by connecting the polylines based on the joints and end caps; and generates a description of the stroke based on the completed polyline path.

17. The system of claim 16, wherein executing the modified SWT on the mask of the stroke comprises:

generating a stroke width image, a stroke orientation image, and a stroke width centerline image of the stroke based on an orientation of each of the pixels, wherein the orientation of each of the pixels is based on a predetermined coordinate system of the image.

18. The system of claim 17, wherein determining the certain centerline points for the stroke comprises:

calculating a consensus of orientation for a center pixel among the pixels based on comparing an orientation of the center pixel to an orientation of each neighboring pixel that surrounds the center pixel on the stroke orientation using the stroke orientation of the stroke; and determining that the center pixel is a certain centerline point among the certain centerline points in response to the consensus of orientation exceeding a predetermined certainty threshold.

19. The system of claim 16, wherein the regions of certainty include all pixels among the pixels that surround all certain centerline points between terminal ends of each of the polylines, and the regions of uncertainty include all remaining pixels among the plurality of pixels.

20. The system of claim 16, wherein the image comprises a writing board, and the stroke is a hand-drawn graphic on the writing board with a marker.

* * * * *